United States Patent [19]

Vaughan

[11] Patent Number: 4,529,471
[45] Date of Patent: Jul. 16, 1985

[54] APPARATUS FOR HEAT SEALING

[75] Inventor: Donald E. Vaughan, Richmond, Va.

[73] Assignee: Reynolds Metals Company, Richmond, Va.

[21] Appl. No.: 635,159

[22] Filed: Jul. 27, 1984

[51] Int. Cl.³ .................. B29D 23/10; B30B 15/34
[52] U.S. Cl. ................................ 156/466; 53/563; 156/544; 156/583.5; 493/302
[58] Field of Search ............ 156/157, 203, 466, 544, 156/583.5, 502, 555; 53/451, 563, 550, 551; 493/302

[56] References Cited

U.S. PATENT DOCUMENTS

| | | | |
|---|---|---|---|
| 2,107,249 | 2/1938 | Hepke | 156/583.5 |
| 2,566,799 | 9/1951 | Humphrey | 53/373 |
| 2,658,552 | 11/1953 | Grevich | 156/498 |
| 2,711,781 | 6/1955 | Langer | 156/290 |
| 2,726,707 | 12/1955 | Wellons et al. | 156/196 |
| 2,897,875 | 8/1959 | Rusch et al. | 156/466 |
| 3,005,402 | 10/1961 | Starger et al. | 100/93 R |
| 3,367,261 | 2/1968 | Kashiwagi | 100/93 P |
| 3,729,359 | 4/1973 | Monsees | 156/466 |
| 3,739,129 | 6/1973 | Miller | 156/203 |
| 4,084,999 | 4/1978 | Rucker | 156/466 |
| 4,213,031 | 7/1980 | Färber | 219/244 |

Primary Examiner—Michael Wityshyn
Attorney, Agent, or Firm—Alan T. McDonald

[57] ABSTRACT

An apparatus for lap sealing plastics resin films is disclosed. The apparatus includes a heated and driven belt and a back-up plate. The belt may be driven independently of the film, such that its speed need not equal that of the film. The back-up plate includes a finger means for orienting the film into a lapped position and a sealing surface which permits the film to slide without damage and which does not act as a heat sink.

6 Claims, 3 Drawing Figures

APPARATUS FOR HEAT SEALING

BACKGROUND OF THE INVENTION

Numerous apparatus for heat sealing plastics resin films are known. Some are intermittent sealers, providing spaced seals across a film web as the film web passes between sealing surfaces. Others are fin sealers, providing a continuous seal along the edges of superimposed film layers, employing either a pair of heated bands or a pair of heated rollers to provide heat to opposing sides of the layered structure. Still others are lap sealers, producing a tube from a single layer of plastics resin film by sealing the overlapped edges of the film to one another. It is to such lap sealers that the present invention relates.

One such lap sealer is described in U.S. Pat. No. 3,729,359. In this patent, a plastics resin film is drawn over a forming tube, with a product passing through the forming tube to be sealed within the tube of plastics resin film to be formed and a free-wheeling heated band travelling in contact with the overlapped edges of the plastics resin film. This band is heated along a portion of its length in contact with the plastics resin film, providing the lapped seal to the film, and is cooled along a subsequent portion of its length in contact with the plastics resin film to avoid sticking of the film to the band after sealing. There are notable shortcomings in this sealer.

First, since the sealing band is driven by the plastics resin film passing between it and the forming tube, it is impossible to vary the speed of the band, thus limiting use of this equipment to those films in which band speed control is not critical. Secondly, due to the tendency of sticking of the film, again, due to the lack of speed control for the band, a cooling element is needed adjacent the heater. Additionally, employing the forming collar as the back-up surface for sealing requires a relatively large forming collar and requires that whenever the size or shape of the tube to be formed changes this large and relatively expensive collar must be replaced in its entirety.

It is thus a primary objective of the present invention to provide a lap sealer for plastics resin film tubes which does not rely upon the film speed for its speed of operation. It is also a primary objective of the present invention to provide a band sealer for lap sealing plastics resin film tubes which eliminates the necessity for a cooling means for the band, thereby reducing energy usage both in the cooling operation and in the need to reheat substantially the cooled band. It is also a primary objective of the present invention to provide a lap sealer for plastics resin film tubes which does not employ the forming collar as a portion of the sealing mechanism, thus allowing the use of readily available commercial forming collars in conjunction with the lap sealing apparatus.

THE PRESENT INVENTION

By means of the present invention, these objectives have been obtained.

The plastics resin film lap sealer of the present invention comprises a driven sealing belt and a back-up plate member. The belt is driven by a motor means independently from the movement of the plastics resin film, and thus may travel at a speed less than, equal to or in excess of that of the film, as required for a given film. A heater bar is positioned in heat transfer relationship to the belt, providing the heat required for sealing, however, no cooling member for the belt is required.

The other component of the system is a backup plate against which sealing takes place. This plate includes a finger means for positioning the lapped film in sealing position and a sealing surface against which sealing of the film takes place. This plate is independent of the forming collar used to form the film into a tube, permitting ready replacement of a collar with a different collar without the need to readjust the sealing system for each collar.

BRIEF DESCRIPTION OF THE DRAWINGS

The heat sealing mechanism of the present invention will be more fully described with reference to the drawings in which.

DETAILED DESCRIPTION OF THE PREFERRED EMBODIMENT

Figure 2:
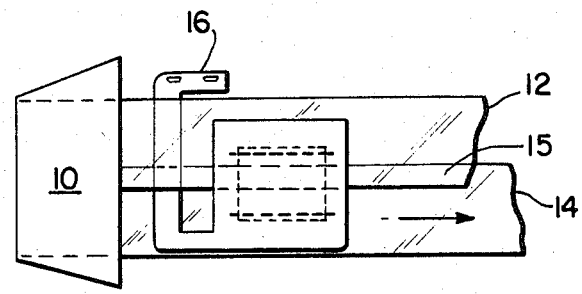
FIG. 2 is a top elevational view of the heat sealing mechanism.
Figure 1:
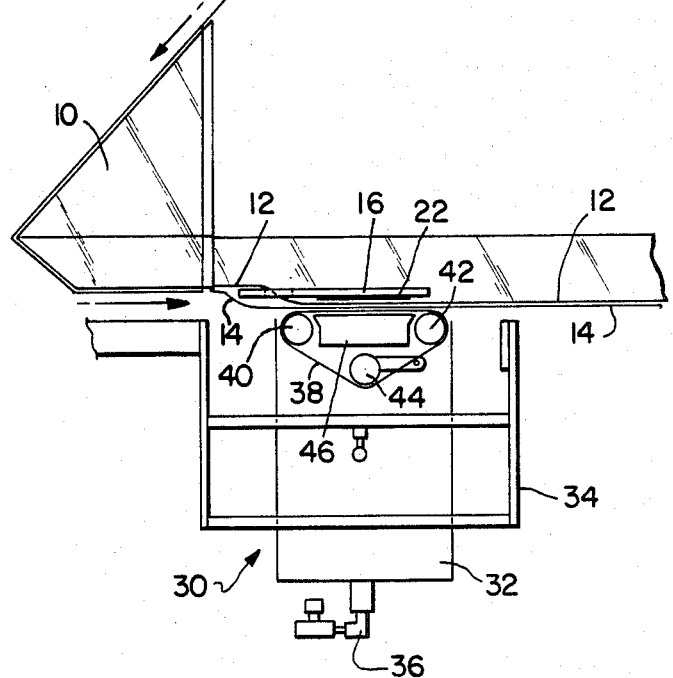
FIG. 1 is a side elevational view of the heat sealing mechanism of the present invention.
Figure 3:
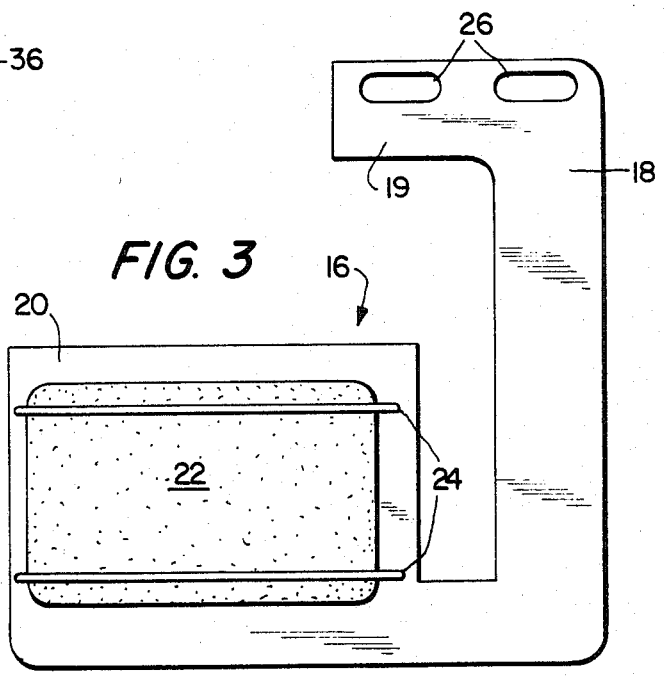
FIG. 3 is a bottom elevational view of the back-up plate employed in the present invention.

Turning to the FIGURES, plastics resin film 1, coming from a source such as a reel not shown, passes downwardly over a forming collar 10 where the film is formed into a tube. The film 1 may be any plastics resin film, such as polyethylene, polypropylene, polyvinyl chloride, and the like. The forming collar 10 may take one of numerous shapes and sizes, depending upon the size and shape of the tube of film to be formed and the product to be packaged therein. As the film 1 passes forming collar 10, its edges 12 and 14 are positioned at the bottom of the tube formed. Edge 12 passes over a finger 18 of back-up plate 16 and is also held in position by arm 19. Edge 14 of film 1 passes completely beneath back-up plate 16. As will be readily evident to those of ordinary skill in the art, a product enters forming collar 10 from the left as illustrated and passes to the right with the film 1 now in its tubular form. As can best be seen in FIG. 2, the overlapped edges 12 and 14 of film 1 form a lap portion 15, which portion 15 is to be heat sealed.

Back-up plate 16 includes mounting openings 26, which are adjustable to permit limited movement of back-up plate 16. As is evident, back-up plate 16 is completely independent from forming collar 10, being bolted or the like to the packaging machine including forming collar 10. Thus, forming collar 10 may be readily replaced with similar units.

Back-up plate 16 also includes a back up surface 20 and back-up pad 22 which is held in place, such as by means of wires 24 attached to back-up surface 20. Pad 22 is formed from a material which will permit the plastics resin film to readily slip across it, and which is not a heat sink material so as to retain the heat at the film seal, thus permitting lower temperature operation of the sealing system and preventing burning of the plastics resin film 1. Felt is typical of the materials that may be used for backup pad 22.

Positioned beneath back-up plate 16 is a band sealer 30. Band sealer 30 comprises base 32 which is slidably mounted within frame 34. Means such as air cylinder 36 may be employed to raise and lower base 32 and thus place band sealer 30 in and out of contact with back-up plate 16.

Band sealer 30 includes a sealing band 38, which may be, for example, a stainless steel band, which is mounted for driven movement in the direction of film travel around rollers 40, 42 and 44. Roller 42 is a driven roller, providing the driving force for band 38 and is attached to adjustable speed motor means (not shown). Roller 40 is a free-wheeling idler pulley and roller 44 is an adjustable idler pulley for adjusting tension of the belt 38.

Positioned beneath belt 38 between rollers 40 and 42 is a heater block 46. Heater block 46 may be, for example, an electrical resistance heater, a heated fluid heater or the like. Preferably, however, heater block 46 is an electrical resistance heater which may be controlled in its temperature by means of controlling the electrical input thereto. Heat from heater block 46 is transferred to belt 38. Belt 38 is positioned beneath back-up pad at 22 and the overlapping edges 12 and 14 are passed therebetween, forming a lapped seal 15.

Depending upon the plastics resin film employed, varying temperatures for heater block 46 are employed and varying speeds of belt 38 are employed. In the case of polyethylene film, belt 38 may travel at a speed approximately equal to that of the film, while for a film such as polyvinylchloride, in order to prevent burning of the film, belt 38 travels at a speed in excess to that of the film. In order that speeds less than or greater than film 1 may be employed for belt 38, it is important that belt 38 be formed of a material which will readily permit the plastics resin film 1 to pass thereover, i.e., is a low friction material. Stainless steel has been found to be a suitable material for belt 38.

To prevent burning of film during stoppage of film movement for whatever reason, belt 38 may be taken out of contact with film 1 by lowering base 32 through air cylinder 36. Contact of film 1 with back-up pad 22 alone, is insufficient to burn the film, since back-up pad 22 is formed from a non-heat sink material.

From the foregoing, it is clear that the present invention provides a controllable apparatus for producing lapped seals in plastics resin films which enables the seal to be formed without damage to the film.

While the invention has been described with relation to certain specific embodiments thereof, it is not intended to be so limited thereby, except as set forth in the accompanying claims.

I claim:

1. A lap sealer for sealing a plastics resin film tube formed at a forming collar and moving at a given speed comprising low friction endless band sealing surface, means for driving said sealing surface at a speed independent of the speed of said film, means for heating said sealing surface, and a back-up plate separate from said forming collar, said back-up plate having finger means for guiding said film and a non-heat sink material surface against which sealing occurs.

2. The lap sealer of claim 1 wherein said non-heat sink sealing surface is formed from felt.

3. The lap sealer of claim 1 wherein said driving means comprises rollers around which said endless band sealing surface passes and a speed controlled motor means for driving at least one of said rollers.

4. The lap sealer of claim 1 wherein said endless band sealing surface comprises a stainless steel band.

5. The lap sealer of claim 1 wherein said heating means comprises an electrically heated block in heat transfer relation to said endless band sealing surface.

6. The lap sealer of claim 5 further comprising means for controlling the temperature of said electrically heated block.

* * * * *